Patented Jan. 30, 1934

1,945,315

UNITED STATES PATENT OFFICE

1,945,315

FORMALDEHYDE CONDENSATION PRODUCT

Ralph A. Jacobson, Wilmington, Del., assignor to E. I. du Pont de Nemours & Company, Wilmington, Del., a corporation of Delaware No Drawing. Application June 4, 1929
Serial No. 368,442

3 Claims. (Cl. 260—3)

This invention relates to formaldehyde condensation products and more particularly to the condensation products of ammonium thiocyanate and formaldehyde.

It is an object of this invention to provide condensation products similar to but not identical with the condensation product of urea or thiourea and formaldehyde but starting with a cheaper and more easily available raw material.

It is another object of this invention to produce coating compositions containing the condensation products set forth herein.

These objects are accomplished by the following invention which comprises the condensation of ammonium thiocyanate and formaldehyde, and the separation of the condensation products, either with or without subsequent polymerization by heat.

In order to demonstrate this process, condensations of ammonium thiocyanate and formaldehyde have been made in an acid medium, an alkaline medium, and, also, in a practically neutral medium, and in all cases polymerizable resins have been obtained. The following examples are given:

Example 1

| | |
|---|---|
| Ammonium thiocyanate | 60 grams |
| Formaldehyde (37%) | 360 grams |
| Hydrochloric acid (10%) | 15 cc's. |

Example 2

| | |
|---|---|
| Ammonium thiocyanate | 60 grams |
| Formaldehyde (37%) | 360 grams |
| Sodium hydroxide (20%) | 1 cc. |

Example 3

| | |
|---|---|
| Ammonium thiocyanate | 60 grams |
| Formaldehyde (37%) | 360 grams |
| Ammonium hydroxide (20%) | 5 grams |

Example 4

| | |
|---|---|
| Ammonium thiocyanate | 60 grams |
| Formaldehyde (37%) | 360 grams |

In each of the above examples, the solution was boiled under a reflux condenser for from 1 to 1¾ hours, and then the condensation product was separated by concentrating to approximately 145 grams, to remove the water.

On evaporation, a slightly yellowish colored syrup was obtained. This syrup was practically insoluble in water, alcohol, ether, benzene, ethyl acetate, and butyl acetate. In all cases, however, it was readily and completely soluble in acetone.

On further heating at a temperature of 90–100° C., the syrupy material gradually polymerizes and becomes more and more viscous, and at the same time more and more difficulty soluble in acetone. On heating for 6 to 8 hours at 100–110° C., the material gradually changes to an insoluble form, which is somewhat rubbery when hot, but hard and brittle when cold.

The material is sufficiently compatible with nitrocellulose, and coating compositions have been prepared from which films have been formed containing nitrocellulose and these condensation products. These films remain clear on drying, indicating absence of separation of the nitrocellulose. In the preparation of these compositions, acetone was used as a mutual solvent for the nitrocellulose and an incompletely polymerized condensation product.

In addition to pyroxylin coating compositions, the condensation products of the invention may be used, either with or without preliminary polymerization, in coating compositions containing other cellulose derivatives, e. g., cellulose acetate, cellulose ether and the like, or in moulding compositions.

Similarly, the condensation products set forth herein may be combined with the other usual ingredients of coating compositions, such as oils, other resins, solvents, driers, and pigments.

One advantage of this invention lies in the fact that ammonium thiocyanate is more readily available and cheaper than other reagents commonly used for the production of resins of a similar character, e. g., urea or thiourea.

As many apparently widely different embodiments of this invention may be made without departing from the spirit and scope thereof, it is to be understood that I do not limit myself to the specific embodiments thereof except as defined in the appended patent claims.

I claim:

1. An incompletely polymerized condensation product of ammonium thiocyanate and formaldehyde, said product being soluble in acetone.

2. A condensation product of ammonium thiocyanate and formaldehyde, said product being soluble in acetone.

3. A process of producing a condensation product of ammonium thiocyanate and formaldehyde which comprises reacting a mixture of ammonium thiocyanate and formaldehyde in the ratio of one molecular weight of ammonium thiocyanate to about 5.5 molecular weights of formaldehyde.

RALPH A. JACOBSON.